United States Patent
Lv et al.

(10) Patent No.: US 7,853,257 B2
(45) Date of Patent: Dec. 14, 2010

(54) METHOD FOR FAST CALL SETUP IN A MOBILE COMMUNICATION SYSTEM

(75) Inventors: Ling Lv, Shanghai (CN); Baikui Xu, Shanghai (CN); Xingyin Tian, Shenzhen (CN)

(73) Assignee: Spreadtrum Communications Inc., George Town, Grand Cayman (KY)

( * ) Notice: Subject to any disclaimer, the term of this patent is extended or adjusted under 35 U.S.C. 154(b) by 889 days.

(21) Appl. No.: 11/499,882

(22) Filed: Aug. 3, 2006

(65) Prior Publication Data

US 2007/0123195 A1 May 31, 2007

(30) Foreign Application Priority Data

Sep. 20, 2005 (CN) .................. 2005 1 0029813
Sep. 20, 2005 (CN) .................. 2005 1 0029814

(51) Int. Cl.
*H04W 4/00* (2009.01)
(52) U.S. Cl. .................. 455/435.1; 455/435.3
(58) Field of Classification Search .......... 455/435.1, 455/435.3
See application file for complete search history.

(56) References Cited

U.S. PATENT DOCUMENTS

| 6,952,411 | B2* | 10/2005 | Sinnarajah et al. ........ 370/335 |
| 2004/0002337 | A1* | 1/2004 | Wheeler et al. ........... 455/445 |
| 2005/0141511 | A1* | 6/2005 | Gopal ................... 370/395.2 |
| 2005/0266853 | A1* | 12/2005 | Gallagher et al. .......... 455/439 |
| 2007/0041343 | A1* | 2/2007 | Barreto et al. ............ 370/329 |
| 2007/0086393 | A1* | 4/2007 | Sinnarajah et al. ........ 370/335 |

OTHER PUBLICATIONS

Ghadialy, Zahid, 3G/UMTS Complete Mobile Originated Circuit Switched Call Setup, 2004 <http://www.3g4g.co.uk/Tutorial/ZG/zg_mocs_setup.html>.*

* cited by examiner

*Primary Examiner*—Vincent P Harper
*Assistant Examiner*—Michael Irace

(57) ABSTRACT

This invention presents a method for fast call setup in a mobile communication system, including the steps of radio resource control (RRC) connection setup, Non-access stratum (NAS) signaling connection setup and NAS signaling interaction, and radio access bearer (RAB) setup. User equipment (UE) sends a RRC CONNECTION REQUEST, which encapsulates NAS, to RNC. In response, the radio resource control (RNC) digests the RRC CONNECTION REQUEST and forwards NAS to the core network (CN), which sends RAB Assignment Request to RNC and starts to send the paging message to the terminal call.

1 Claim, 4 Drawing Sheets

METHOD FOR FAST CALL SETUP IN A MOBILE COMMUNICATION SYSTEM

FIELD OF THE INVENTION

This invention relates to a method of call setup in a mobile communication system (MCS), and more particularly, a method of session setup in Universal Mobile Telecommunications System (UMTS).

BACKGROUND

In communication systems, the duration of the call setup (or call setup delay) is a factor in the quality of service (QoS). For certain services, such as interactive games, emergency voice calls, or "push to talk" over cellular (PoC), which are sensitive to the call setup delay, the call setup delay can be too lengthy (usually 6 to 10 seconds).

A brief introduction of call setup in a UMTS system is first provided. The process of call set-up for user equipment (UE) is represented by FIG. 1, which incorporates several main functional entities, such as the UE, NodeB, radio network controller (RNC) and core network (CN). FIG. 1 also shows a user initiated PoC service in the domain of packet service (PS), while radio resource control (RRC) connection is built in the dedicated channel (DCH).

As to the original call in FIG. 1, call setup usually contains the following steps:
1) RRC connection setup;
2) Non-access stratum (NAS) signaling setup and NAS signaling interaction;
3) Radio access bearer (RAB) setup.

As to the terminal call in FIG. 2, call setup usually contains the following steps:
1) Paging;
2) RRC connection setup;
3) Non-access stratum (NAS) signaling setup and NAS signaling interaction;
4) Radio access bearer (RAB) setup.

The objective of RRC connection setup is to build the dedicated signaling connection between the UE and the UMTS Terrestrial Radio Access Network (UTRAN), containing several RNCs and NodeBs, as well as transferring the signaling between UE and UTRAN, or between UE and CN, with a use of the UU interface (i.e. the over-the-air interface between UE and NodeB).

Phase 1 in FIG. 1 depicts RRC connection setup. UE sends a RRC CONNECTION REQUEST through random access channel (RACH), that is, the uplink common transportation channel. Before the message is sent, layer 1 has to send a PRACH preamble for try-access. If access is successful, the RRC connection is sent to set up messages. After receiving the RRC CONNECTION REQUEST, RNC will decide whether to permit the access of UE. If so, RNC will relocate the related resources and configure NodeB. The configuration includes Radio Link (RL) connection, Iub interface (the interface of RNC and NodeB) data transport bearer setup and Iub interface Frame Protocol (FP) synchronization. After configuring NodeB, RNC starts to relocate the internal entities of RNC, such as the entities of Radio Link Control (RLC) and Medium Access Control (MAC). Then through the common transportation channel Forward Access Channel (FACH), RNC send RRC connection Setup messages. UE, after receiving this message, relocates RLC, MAC and Layer 1. Then L1 synchronization of the dedicated physical channel takes place. Through uplink DCH, UE sends RRC Connection Setup Complete messages to indicate that RRC connection setup is successfully finished. Protocol analysis and test illustrate that RRC connection setup delays mainly involve delays at the stages of random access process, RRC CONNECTION REQUEST, NodeB relocation process of RNC, RRC Connection Setup, L1 synchronization, and RRC Connection Setup Complete.

The objective of NAS signaling connection setup is to build signaling interaction between UE and CN. NAS signaling connection setup and signaling interaction are shown by Phase 2 in FIG. 1. NAS signaling involves Service Request for the original call, Paging Response for the terminal call, Signaling Connection Control Part (SCCP) at IU interface (the interface between RNC and CN), Authentication and Ciphering request, Security Mode setup, Temporary Mobile Subscriber Identity (TMSI) reassignment, Activate Packet Data Protocol (PDP) Request, etc. According to the protocol, Authentication and Ciphering in NAS signaling and TMSI reassignment are optional. However, the following will be focused on the compulsory parts. Note, what is illustrated in FIG. 1 is NAS signaling in the process of PS domain session setup. The Circuit Switched (CS) domain has different NAS signaling. But the CS domain and the PS domain are generally similar from the point of view of NAS setup delay. Protocol analysis and test illustrate that NAS signaling connection setup delays mainly involve delays at the stages of Service Request or Paging Response, SCCP connection setup, Security Mode setup, Activate PDP Context Request (for PS domain), Setup (for CS domain), etc.

After NAS signaling connection completion, RAB setup is under way as shown by phase 3 in FIG. 1. CN sends RAB Assignment Request to RNC, which, after receiving the request, undertakes the mapping from RAB to RB, and RL relocation, ALCAP setup and FP synchronization to NodeB. Then RNC sends RB Setup to UE, which, whereupon relocates RLC, MAC and Layer 1 of its local end and sends RB Setup Complete to RNC. RNC, after configuring RLC and MAC of its local end, sends RAB Assignment Response to notify CN of the successful setup of the side RAB. CN, as a matter of fact, will send Activate PDP Context Accept to UE, in order to inform UE that the data can be transmitted. Thus RAB setup is successful.

FIG. 2 shows the same signaling process from the point of view of the terminal UE receiving the call. As the figure shows, the process begins as the terminal UE receives a paging request from CN. The signaling process then continues just as described for FIG. 1, with the additional step that UE sends a paging response at the beginning of the NAS phase.

It is obvious that the call setup process of the present technique involves so many signaling steps that the call setup time delay is a little bit long. As shown by the data and tests, the call setup time delay of UMTS system is longer than that of the GSM system. Therefore, as to the service that is sensitive to the call setup delay, it is necessary to reduce the call setup time delay of UMTS system to improve the users' satisfaction.

SUMMARY OF THE INVENTION

This invention presents a method for fast call setup in a mobile communication system, including the steps of RRC connection setup, NAS signaling connection setup and NAS signaling interaction, and RAB setup. UE sends a RRC CONNECTION REQUEST, which encapsulates NAS messages, to RNC. In response, RNC digests the RRC CONNECTION REQUEST messages and forwards NAS messages to CN, which sends RAB Assignment Request to RNC and starts to send a paging message to the terminal call. CN sends RAB assignment request to RNC in advance, which will in turn digest the messages and finish the configuration.

The advantage of this method is to reduce the interaction of signaling. At the same time, it can send the call earlier, and shorten the delay, so as to improve the satisfaction of the end user.

DESCRIPTION OF THE PREFERRED EMBODIMENT

Figure 3:
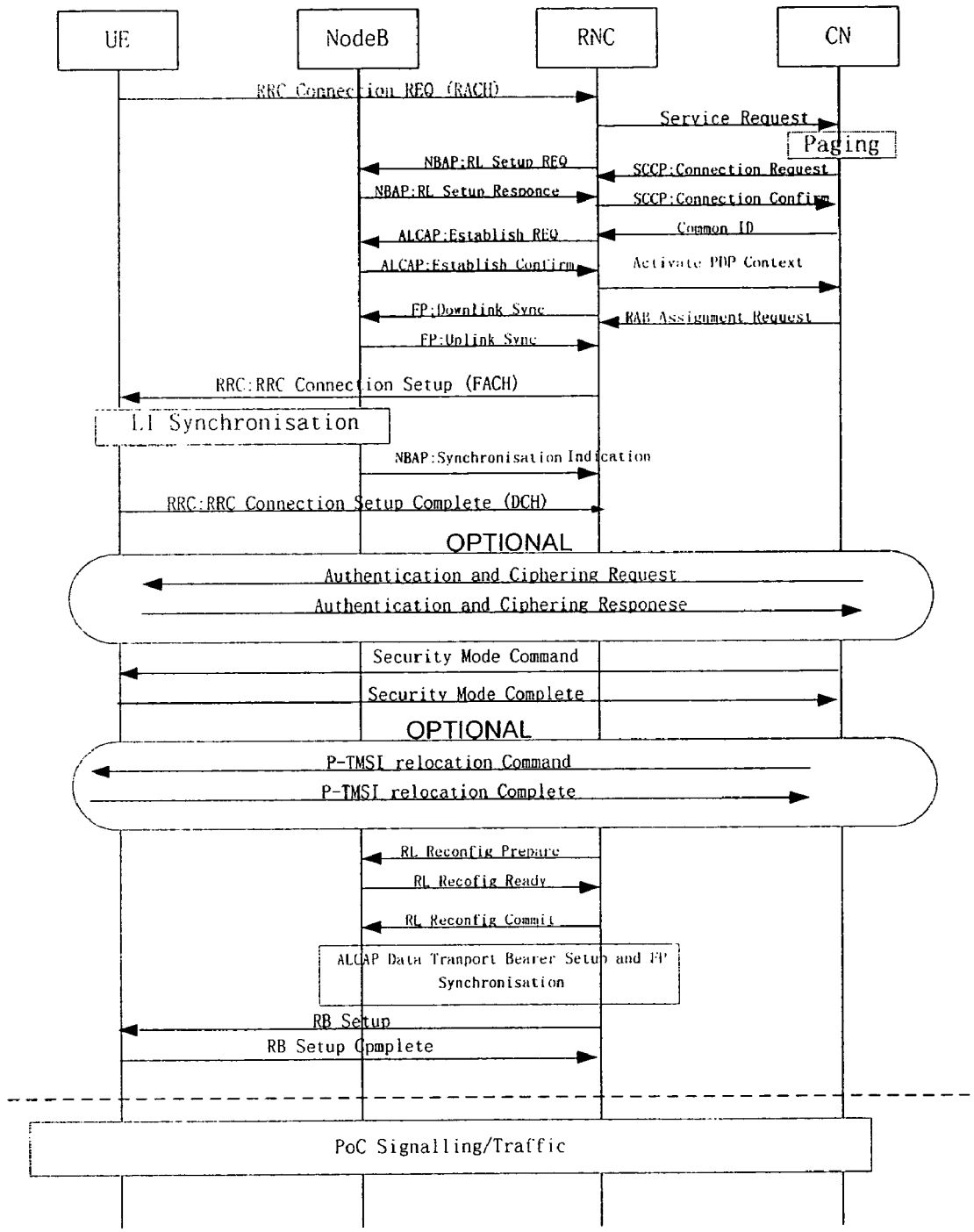
FIG. 3 is the flow chart of the call setup method for the local end of the original call in this invention.
Figure 4:
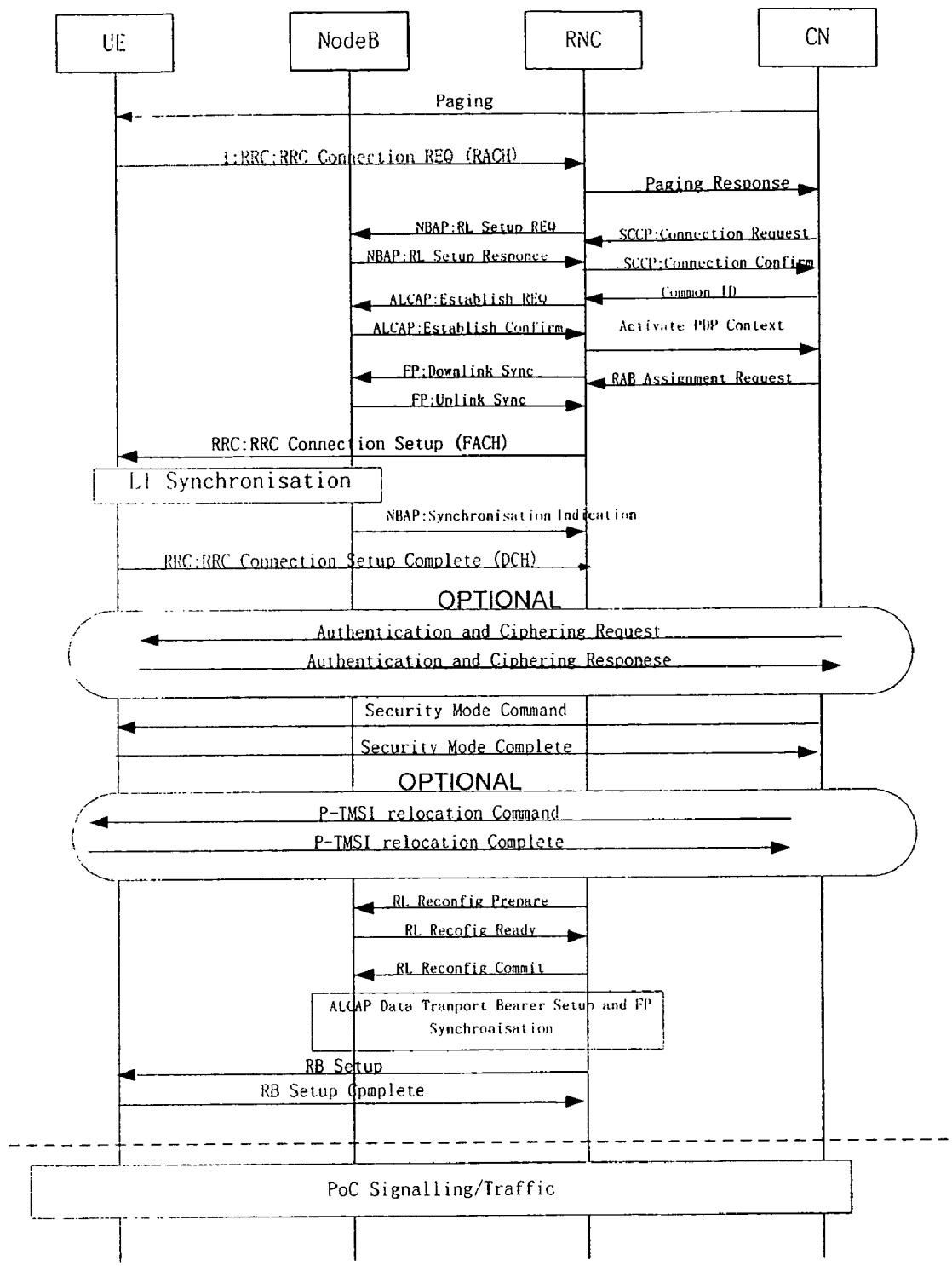
FIG. 4 is the flow chart of the call setup method for the local end of the terminal call in this invention.

As depicted in FIG. 3 and FIG. 4, the method for call setup of the UE involves the following steps:

Step A: RRC connection setup;

Step B: NAS signaling connection setup and NAS signaling interaction between UE and CN;

Step C: RAB setup.

Figure 1:
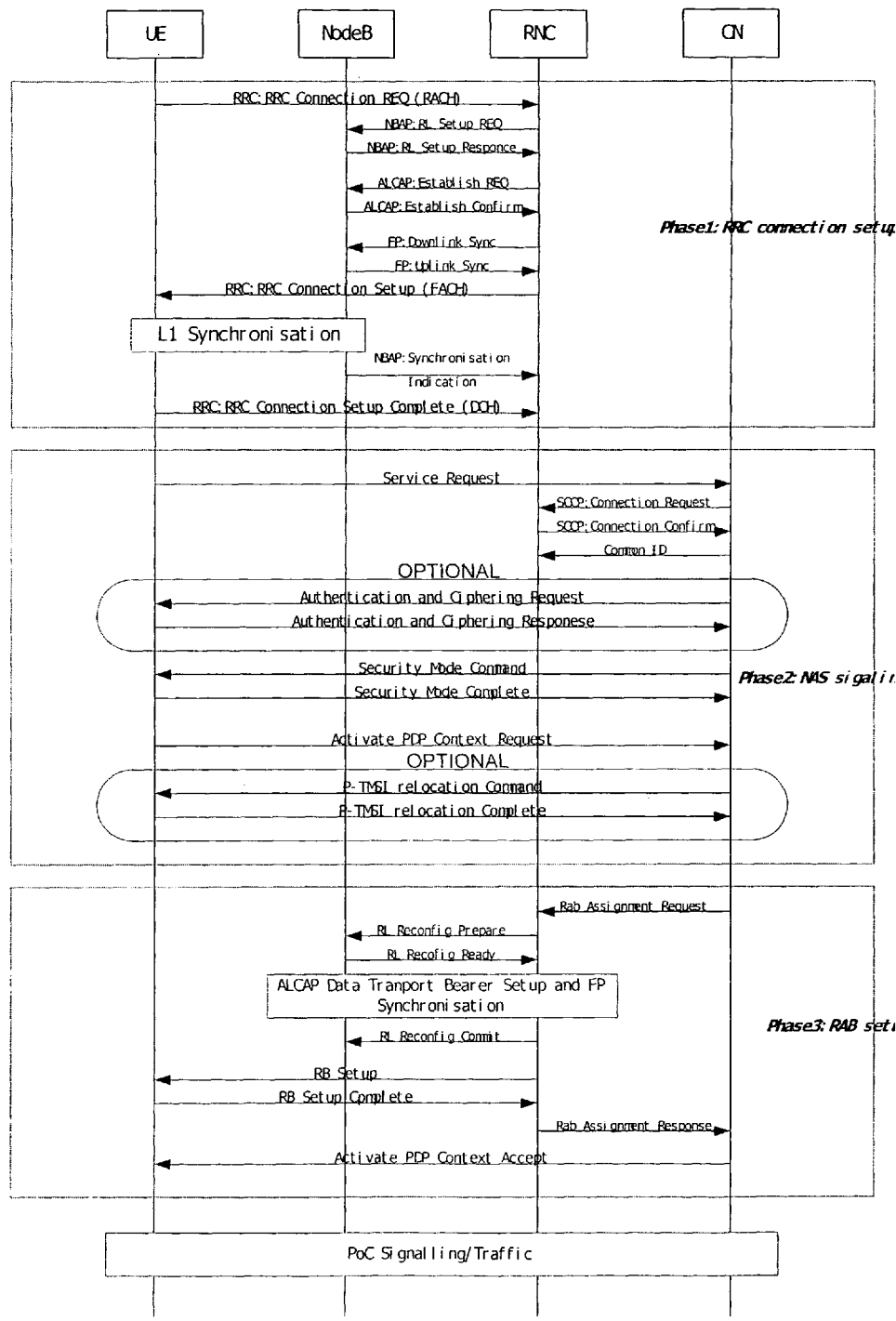
FIG. 1 is a flow chart of the call setup method for the local end of the original call at present.
Figure 2:
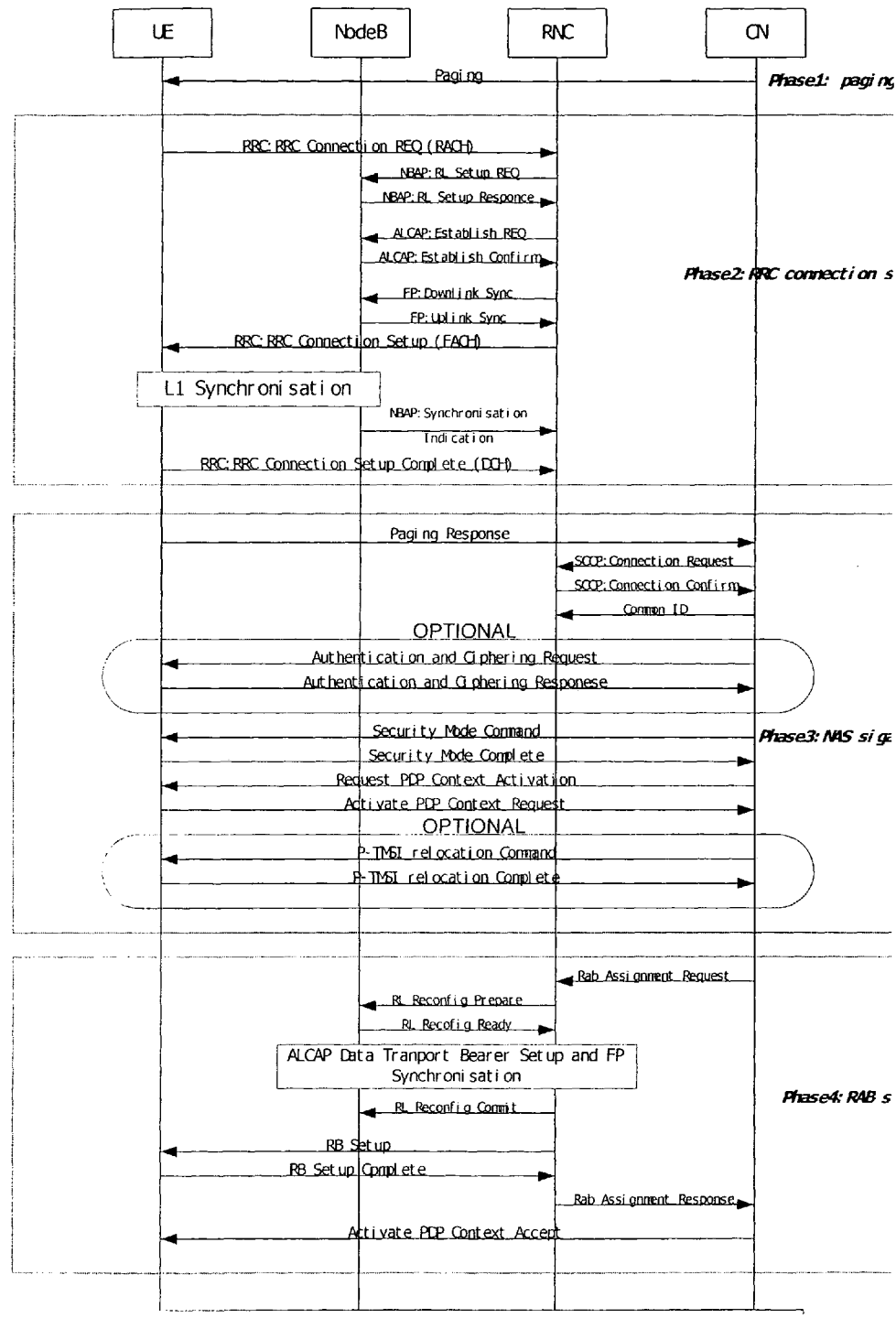
FIG. 2 is the flow chart of the call setup method for the local end of the terminal call at present.

As in FIGS. 1 and 2, the original call process differs from the terminal call process in the initial paging request and paging response. Otherwise, the processes shown in FIG. 3 and FIG. 4 are identical.

Step A involves the following steps:

Step A1: UE sends RRC CONNECTION REQUEST to RNC. This RRC CONNECTION REQUEST message encapsulates NAS messages (that is, NAS Service Request or Paging Response and Activate PDP Context Request or Setup). As to the original call, the encapsulated NAS messages can be Service Request only or Service Request plus Activate PDP Context Request/Setup. As to the terminal call, the encapsulated NAS messages can be Paging Response only or Paging Response plus Activate PDP Context Request/Setup.

Step A2: RNC allocates the related resources to configure Node B in such a way that RNC sends Radio Link Setup Request to NodeB, which sends Radio Link Setup Response to RNC in turn. RNC sends Data Transport Bearer Setup Request to NodeB, which returns Confirmed Data Transport Bearer Setup to RNC. Finally, RNC sends Downlink Synchronization to NodeB, which will send Uplink Synchronization to RNC in return.

Step A3: RNC sends Service Request or Paging Response to CN.

Step A4: SCCP is built between RNC and CN. CN sends SCCP Connection Request to RNC. RNC then returns SCCP Connection Confirmation.

Step A5: RNC sends Activate PDP Context Accept (for the use of PS domain call), or sends the SETUP message (for the use of CS domain).

Step A6: CN sends Common ID to RNC.

Step A7: CN sends RAB Assignment Request to RNC.

Step A8: RNC sends RRC Connection Setup to UE.

Step A9: UE configures RLC, MAC and Layer 1 of the local end, and then conducts the synchronization of the dedicated physical channel. After the synchronization, UE sends RRC Connection Setup Complete. At this point RRC connection setup is successful.

Step B involves the following steps:

Step B1: Authentication and Ciphering, which is optional. In this process, CN sends Authentication and Ciphering Request to UE, which will return Authentication and Ciphering Response to CN.

Step B2: Security Mode configuration. In this process, CN sends Security Mode order to UE, which will return Security Mode Complete to CN.

Step B3: TMSI reassignment, which is optional too. In this process, CN sends TMSI Reassignment Command to UE, which will return TMSI Reassignment Complete to CN.

Step C involves the following steps:

Step C1: RNC reconfigures the radio link after receiving RAB Assignment Request by sending a Radio Link Reconfiguration Request to NodeB, which will send Radio Link Reconfiguration Preparation to RNC. Finally, RNC sends a radio link reconfiguration order to NodeB.

Step C2: RNC and NodeB perform data transport bearer setup and synchronization.

Step C3: RNC sends Radio Bearer Setup to UE.

Step C4: UE sends Radio Bearer Setup Complete to RNC.

As mentioned above, this invention possesses the following differences and advantages compared with the present techniques as shown in FIG. 1.

(1) NAS signaling is simplified between UE and CN. Service Request or Paging Response and Activate PDP Context or Paging Response or SETUP are deleted. The simplified NAS signaling mainly involves the procedures such as Authentication and Ciphering, Security Mode, and TMSI reassignment. Furthermore, Authentication and Ciphering, TMSI reassignment can be optional, with only Security Mode being compulsory. The advantage of this method is to shorten the time delay of NAS signaling interaction.

(2) The RRC connection request process is modified. This request encapsulates NAS (that is, Service Request or Paging Response and Activate PDP Context Request/SETUP). Therefore, RNC will analyze the request from RRC, and forward Service Request or Paging Response and Activate PDP Context Accept or SETUP to CN.

(3) CN, responding to Service Request or Paging Response and Activate PDP Context Accept, will send RAB assignment to RNC and begin to make a call to the terminal end.

What is claimed is:

1. A method for fast call setup in a mobile communications network, comprising:
   setting up a RRC (Radio Resource Control) connection;
   setting up a NAS (Non-access Stratum) signaling connection and NAS signaling interaction; and
   setting up RAB (Radio Access Bearer);
   wherein the step of setting up a RRC connection comprises the steps of:
      sending a RRC connection setup request that encapsulates one or more NAS messages from a UE to a RNC;
      forwarding the one or more NAS messages from the RNC to a CN;
      sending a RAB assignment from the CN to the RNC; and
      sending a paging message to the terminal call UE,
   wherein the step of setting up a RRC connection further comprises:
   allocating resources at the RNC to configure a NodeB that is communicating with the UE;

sending Service Request or Paging Response from the RNC to the CN;

building SCCP between the RNC and the CN;

sending Activate PDP (Packet Data Protocol) Context Accept or setup message from the RNC to the CN;

sending Common ID from CN to RNC;

sending RAB Assignment Request from the CN to the RNC;

sending RRC Connection Setup from the RNC to the UE;

configuring RLC, MAC and Layer 1 at the UE and synchronizing the dedicated physical channel; and sending RRC connection Complete from the UE to the RNC.

* * * * *